No. 767,778. Patented August 16, 1904.

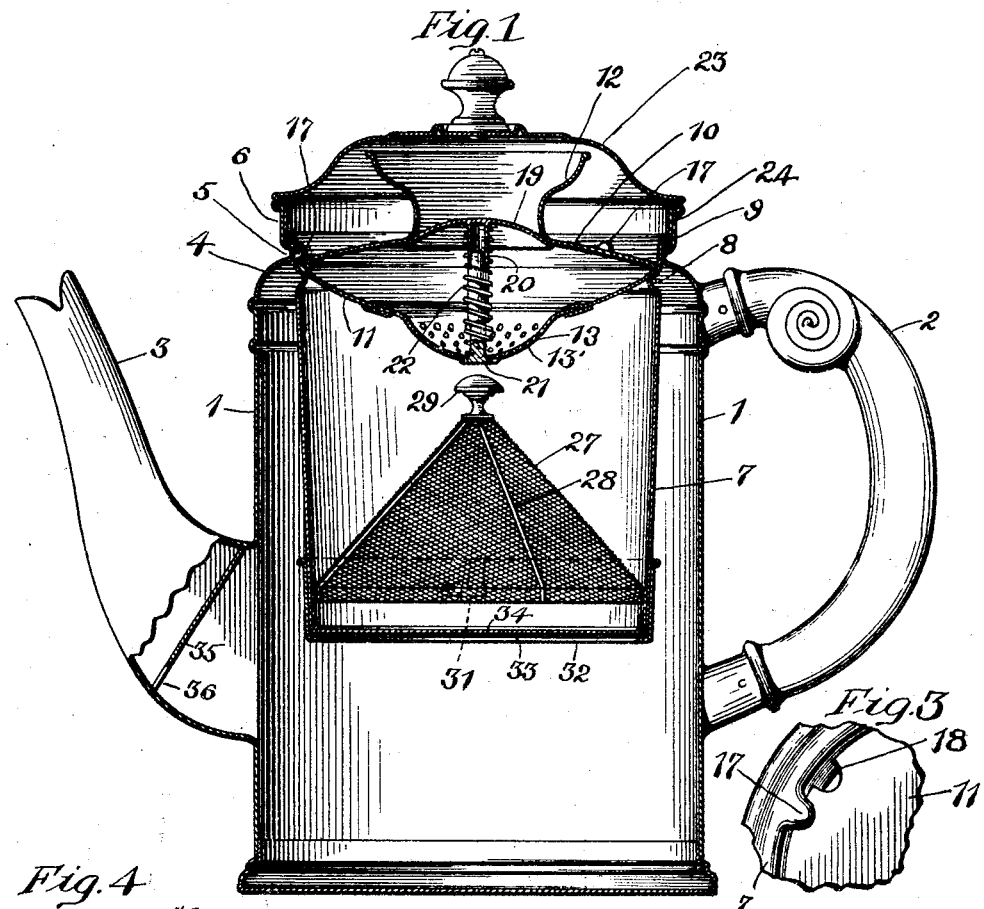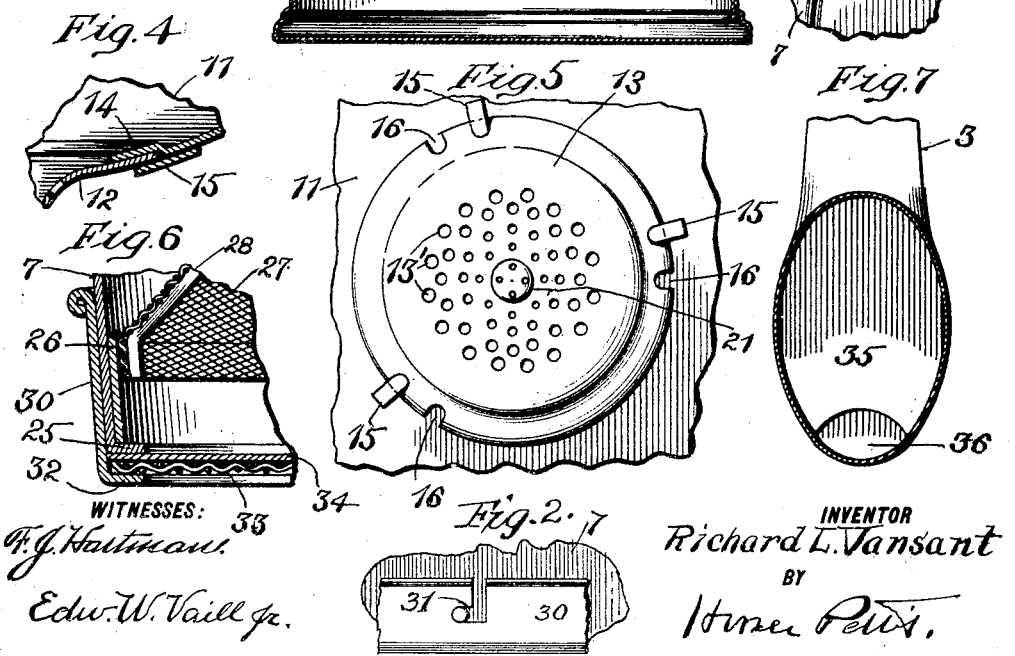

UNITED STATES PATENT OFFICE.

RICHARD L. VANSANT, OF HAVERFORD, PENNSYLVANIA.

COFFEE-POT.

SPECIFICATION forming part of Letters Patent No. 767,778, dated August 16, 1904.

Application filed January 30, 1904. Serial No. 191,313. (No model.)

*To all whom it may concern:*

Be it known that I, RICHARD L. VANSANT, a citizen of the United States, and a resident of Haverford, Montgomery county, State of Pennsylvania, have invented certain new and useful Improvements in Coffee-Pots, of which the following is a full, clear, and complete disclosure.

One object of my invention is to provide a coffee-pot in which coffee may be made quickly and easily by passing hot or boiling water through a body of ground coffee, which is generally known after being made as "drip-coffee."

A further object of my invention is to provide means such that the ground coffee may be entirely retained within the receptacle in which it is placed, while the hot water after passing through the body of the ground coffee may be completely clarified. At the same time the means for clarifying the liquid coffee may be easily removed and placed in position without the use of complicated and delicate parts.

Briefly, the form of my invention herein disclosed comprises an outer casing within which is suspended the coffee-holding receptacle having a removable bottom which is adapted to hold the coffee-filtering means in place. This receptacle is also provided with means for keeping the ground coffee separate from the filtering means, while the top of the receptacle is provided with means of the nature of a spray or shower for distributing the water over the entire body of the ground coffee, and above this is an automatic trap for preventing the steam from escaping while the water is being poured in. The nozzle or spout of the coffee-pot is also provided with means for preventing the escape of steam therethrough, while at the same time the coffee is allowed to be poured therefrom.

For a full detail and an exact description of this form of my invention reference may be had to the following specification and to the accompanying drawings, forming a part thereof, in which—

Figure 1 is a vertical sectional central view of my improved coffee-pot. Figs. 2, 3, 4, and 5 are detailed views of means for holding the different transverse partitions removably in position; Fig. 6, a sectional view taken through the lower portion of the coffee-receptacle, showing the means for holding the filter removably in position and for supporting the reticulated partition for confining the body of the coffee within its receptacle; Fig. 7, a sectional view of the spout or nozzle, showing the means for preventing the steam from escaping therefrom.

Referring to the drawings, the numeral 1 indicates the usual cylindrical casing of the body of the coffee-pot, to which is attached the handle 2 and the nozzle or spout 3. The upper portion of the cylindrical casing curves inwardly, as shown at 4, and terminates in a bead 5, from which extends upwardly a short substantially cylindrical portion 6.

The coffee-holding receptacle comprises the substantially cylindrical casing 7, which tapers slightly toward its bottom and is provided at this upper portion with two beads or flanges, the lower one of which projects inwardly, as illustrated at 8, while the upper one projects outward, as indicated at 9. The outwardly-extending flange or bead 9 is adapted to rest upon the flange or bead 5, and thereby retain the cylindrical casing 7 suspended within the cylindrical casing 1. Upon the bead or flange 8 a chamber or compartment 10 is adapted to rest, and this may be described as follows: This receptacle 10 comprises a circular portion 11, which is substantially the shape shown in cross-section, Fig. 1, and extends upwardly to form the hopper or tunnel shaped opening, as illustrated at 12. The bottom portion of this chamber or compartment consists of a removable cup-shaped portion 13, which has a series of holes 13' therein, which are smaller in the center and larger toward its outer edge, as illustrated in Fig. 5, and is attached to the portion 11 by means of an annular flange 14 and a series of projections or lugs 15, which are adapted to pass through the edge of the strainer or shower 13 by means of recesses or notches 16 when said strainer or shower is being removed or placed in position.

The circular portion 10 of the chamber 11 is held in position on the flange 8 by means of three or more lugs 17, which project inwardly from the wall of the receptacle 7 slightly above the bead 8. The circular portion 11 of the compartment 10 is provided with corresponding notches 18, which are adapted to allow said lugs 17 to pass the edge of the circular portion 11 in placing said chamber in or removing same from the receptacle 7.

Within the chamber 11 and resting against the lower portion of the hopper or tunnel 12 is a valve 19, which has a tubular portion 20 projecting from the under side thereof, which is adapted to fit over and slide upon the pin or rod 21, fixed to the bottom of the strainer or shower 13. A coiled spring is retained about the tubular portion 20 and forces the valve upward with sufficient pressure to retain the same in position, but to allow the water to force the same downward slightly, so as to enter the chamber 11.

A cover 23, having a cylindrical flange 24, is adapted to inclose the tunnel or hopper 12, and said flange is adapted to fit within the cylindrical portion 6, and thereby retain the bead 9 of the receptacle 7 in position upon the bead 5.

The lower end of the receptacle 7 has an inwardly-projecting flange 25. Upon the flange 25 a band or cylindrical portion 26 is adapted to rest. This band is soldered or otherwise attached to a conical wire-gauze strainer 27, which is provided with several strengthening-wires 28, which are also attached to the band 26 and to a knob or handle 29, at apex of the cone. The receptacle 7 being slightly tapered toward the bottom, this wire-gauze strainer or partition may be easily removed for cleaning or other purposes. I also provide a cylindrical cap 30, which is adapted to fit over the lower end of the receptacle 7 and is retained thereon by means of a pin or slot connection, as illustrated in Fig. 2 by the numeral 31. The lower portion of this cap 30 consists of an inwardly-projecting flange 32, upon which rests a coarse-wire grating 33, which may be attached to said flange 32 by being soldered thereto or may be removable therefrom, as is desired. The grating 33 is adapted to have placed upon it a piece of filter-paper or other similar material 34, which is retained in position by clamping the same between said wire grating and the flange 25.

As means for preventing the escape of steam through the nozzle or spout 3 of the coffee-pot I provide a transverse diaphragm or partition 35, which is cut away or recessed at its lower portion, as indicated at 36. This prevents the steam and vapor from escaping, because of the fact that only a small opening is provided, and the steam or vapor which condenses into liquid form upon the inner surface of the diaphragm is partly cooled and acts in the manner of a valve to keep the opening substantially closed, except when the liquid coffee is being poured through the spout.

In the use of this form of my invention the parts are first removed from the interior of the casing 1, the cap 30, with the grating 33, is disengaged from the bottom of the casing 7, and a piece of filter-paper or similar material is placed upon said grating 33. The cap is then replaced upon the bottom of the casing 7 and the filter thereby clamped securely in position by the flange 25. The strainer or reticulated partition is then placed within the casing 7 and said casing 7 then inserted within the coffee-pot until the bead 9 rests upon the bead 5. The casing 7 above the strainer 27 is then filled with coffee to the required amount and the compartment 10 then placed within the casing 7, so that the portion 11 rests upon the bead 8. When the parts are in these positions, the coffee-pot is ready to have the hot water added. The hot water is then poured through the hopper 12 and then in slightly depressing the valve or trap 9 enters the chamber 11 without allowing any steam to escape upward and after passing through said chamber 11 is distributed evenly upon the ground coffee above the strainer 27 by means of the shower or strainer 12.

The water in passing through the ground coffee above the partition 27 absorbs the flavor from the same in the usual manner and then passes through the filter-paper 34 and the screen or grating 33, after which it is retained in the bottom of the coffee-pot until used.

Among the advantages of the construction above described attention is particularly called to the following:

First. All parts are made removable and completely separable, so that they can be thoroughly cleansed.

Second. The bottom of the ground-coffee chamber is made removable, so that the filtering material, such as paper or cloth, may be easily inserted, removed, and discarded each time coffee is made, thereby always providing filtering material in a fresh and clean condition for use.

Third. The trap or valve 19 prevents any steam or vapor from escaping when the water is added to the coffee or when it is desired to put more water into the coffee-pot after the coffee has once been made.

Fourth. The shower or strainer 12 distributes the water evenly over the body of the ground coffee, so that the same percolates evenly through all portions of the coffee, thereby absorbing its strength with greatest efficiency.

Fifth. The conical reticulated partition or strainer 27 retains the ground coffee in position and keeps the same away from the filtering material to prevent the ground coffee from packing and also gives a greater surface to allow the liquid to percolate through the under surface of the ground coffee.

Sixth. The diaphragm or partition in the nozzle of the coffee-pot prevents the steam from escaping while the coffee-pot is standing without any liability of clogging, so that the coffee could be easily poured therefrom.

Having thus described the nature of my invention and this embodiment thereof, I do not wish to be understood as being limited to the exact details of form and proportion of parts herein set forth; but

What I claim, and desire to protect by Letters Patent of the United States, is—

1. In a coffee-pot, an inner casing forming a receptacle for ground coffee, a conical reticulated partition in the lower portion of said casing, means for retaining filtering material in position over the lower end of said casing, said partition being adapted to retain the ground coffee out of contact with said filtering material, a foraminous partition in the upper portion of said casing adapted to distribute the water over the ground coffee in said casing.

2. In a coffee-pot, an inner casing forming a receptacle for ground coffee, said casing having a flange at its lower portion, a conical reticulated partition supported by said flange, a foraminous cap adapted to be retained over the lower end of said casing, and filtering material adapted to be clamped in position between said cap and said flange.

In witness whereof I have hereunto set my hand this 28th day of January, 1904.

RICHARD L. VANSANT.

Witnesses:
LEWIS H. VAN DUSEN,
EDW. W. VAILL, Jr.